US008526673B2

(12) United States Patent
Fukuda

(10) Patent No.: US 8,526,673 B2
(45) Date of Patent: Sep. 3, 2013

(54) APPARATUS, SYSTEM AND METHOD FOR RECOGNIZING OBJECTS IN IMAGES USING TRANSMITTED DICTIONARY DATA

(75) Inventor: Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 12/903,477

(22) Filed: Oct. 13, 2010

(65) Prior Publication Data

US 2011/0091072 A1    Apr. 21, 2011

(30) Foreign Application Priority Data

Oct. 20, 2009 (JP) ................................ 2009-241881

(51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS

| 7,428,021 | B2 | 9/2008 | Fukuda | |
|---|---|---|---|---|
| 7,522,772 | B2 | 4/2009 | Porter et al. | |
| 7,683,973 | B2 | 3/2010 | Fukuda | |
| 2002/0001398 | A1* | 1/2002 | Shimano et al. | 382/104 |
| 2005/0129275 | A1 | 6/2005 | Porter et al. | |
| 2008/0131021 | A1 | 6/2008 | Fukuda | |
| 2008/0271112 | A1* | 10/2008 | Waker et al. | 726/1 |

FOREIGN PATENT DOCUMENTS

| JP | 2004-221753 | | 8/2004 |
|---|---|---|---|
| JP | 2004-363871 | A | 12/2004 |
| JP | 2005-044075 | A | 2/2005 |
| JP | 2005-174352 | | 6/2005 |
| JP | 2006-154476 | A | 6/2006 |
| JP | 2007-058532 | A | 3/2007 |

OTHER PUBLICATIONS

Yang et al., "Detecting Faces in Images: A Survey", IEEE Transactions on Pattern Analysis and Machine Intelligence, vol. 24, No. 1, Jan. 2002, pp. 34-58.
Rowley et al., "Neural network-based face detection", IEEE Transactions on Pattern Analysis and Machine Intelligence, vol. 20, No. 1, Jan. 1998, pp. 1-27.
Viola and Jones, "Rapid Object Detection using Boosted Cascade of Simple Features," Proceedings of the IEEE Conference on Computer Vision and Pattern Recognition (2001), pp. 1-9.
Jul. 22, 2013 Japanese Office Action in Japanese Application No. 2009-241881.

* cited by examiner

*Primary Examiner* — Nirav G Patel
(74) *Attorney, Agent, or Firm* — Fitzpatrick, Cella, Harper & Scinto

(57) ABSTRACT

An image processing apparatus capable of communicating with a plurality of servers stores image data including an object of recognition, and a plurality of recognition dictionaries. The image processing apparatus establishes communication with one of the servers to receive, from the server with which the communication has been established, designation information designating a recognition dictionary for recognizing the object of recognition included in the image data. The image processing apparatus identifies the recognition dictionary designated in the received designation information from among the stored recognition dictionaries and uses the identified recognition dictionary to recognize the object of recognition included in the image data.

14 Claims, 10 Drawing Sheets

F I G. 13
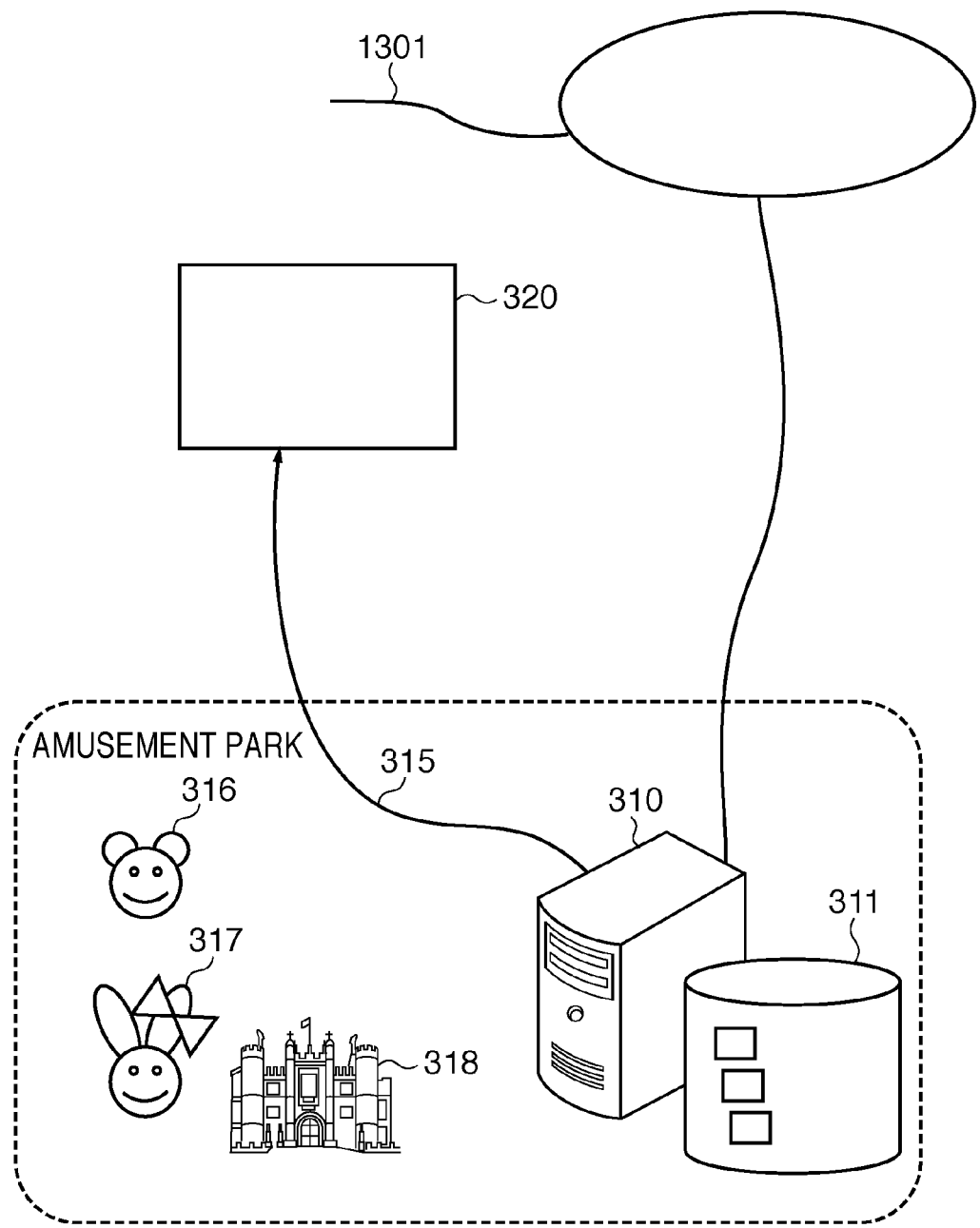

APPARATUS, SYSTEM AND METHOD FOR RECOGNIZING OBJECTS IN IMAGES USING TRANSMITTED DICTIONARY DATA

BACKGROUND OF THE INVENTION

1. Field of the Invention

The present invention relates to a digital data processing scheme. Particularly, the present invention relates to an apparatus that recognizes a specific signal included in digital data, or more specifically, an apparatus that detects a specific object of shooting from digital image data, and a system and method associated with the apparatus.

2. Description of the Related Art

In recent years, the spread of digital cameras, video, or digital camera functions in mobile phones has facilitated creation of digital image data. For example, a technique of detecting faces from digital image data is generally known. In shooting with a digital camera, for example, this face detection technique is applied to exposure, a focus position, or adjustment of light for stroboscopic light emission. The face detection technique is also applied, such as in image printing, to detecting faces in an image and adjusting the brightness and tones of the entire image so that the brightness and colors of the detected face areas become appropriate. These functions are incorporated into products and put on the market.

Another application of the face detection technique is roughly classifying images into human images and landscape images, for example. By classifying in this manner, this technique can be used as means for automatically adding bibliographic information (metadata) to images. That is, the face detection technique is applied to each image to obtain information about "how many faces of which sizes are present at which positions in the image," and based on this information, each image is classified or retrieved.

Image processing methods to automatically detect a particular pattern of an object of shooting from an image are very useful and can be used to determine a human face, for example. Such image processing methods can be used in many fields such as teleconferencing, man-machine interfaces, security, monitor systems for tracking a human face, and image compression.

For example, a non-patent document 1, "Yang et al, "Detecting Faces in Images: A Survey", IEEE TRANSACTIONS ON PATTERN ANALYSIS AND MACHINE INTELLIGENCE, VOL. 24, NO. 1, JANUARY 2002" describes various schemes for the technique of detecting faces from an image. Among others, the document indicates a scheme in which human faces are detected by utilizing several noticeable features (such as two eyes, a mouth, and a nose) and unique geometric position relationships among the features, or by utilizing symmetrical features of human faces, complexional features of human faces, template matching, a neural network, and the like.

A scheme proposed in a non-patent document 2, "Rowley et al, "Neural network-based face detection", IEEE TRANSACTIONS ON PATTERN ANALYSIS AND MACHINE INTELLIGENCE, VOL. 20, NO. 1, JANUARY 1998" is a method of detecting facial patterns in an image by using a neural network. The face detection method according to the non-patent document 2 will be briefly described below.

First, image data from which faces are to be detected is read into memory, and a predetermined area to be matched with faces is clipped out from the read image. A pixel value distribution in the clipped-out area is input, and an output is obtained with neural network-based operations. Here, weights and threshold levels for the neural network are learned in advance with a vast number of facial image patterns and non-facial image patterns. For example, a face is identified if the output of the neural network is not smaller than 0: otherwise, non-face is identified. Positions for clipping out an image pattern to be matched with faces as inputs of the neural network are sequentially scanned across the entire image area horizontally and vertically, so that faces are detected from the image. In order to address detection of various sizes of faces, the read image is successively scaled down by predetermined factors to perform the above face detection scan for the scaled-down images.

A further example that focuses the attention on speedup of processing is a non-patent document 3, "Viola and Jones, "Rapid Object Detection using Boosted Cascade of Simple Features", Proceedings of the IEEE Conference on Computer Vision and Pattern Recognition (CVPR'01)". In this report, AdaBoost is used to increase the face discrimination accuracy with an effective combination of many weak discriminators. On the other hand, each weak discriminator is configured with a Haar-type rectangle feature amount, and further an integral image is used to calculate the rectangle feature amount at a high speed. Also, the discriminators obtained with AdaBoost learning are serially connected to configure a cascade face detector. This cascade face detector first uses a simple (that is, with a smaller amount of computation) discriminator at a preceding stage to remove candidates of patterns that are obviously not a face on the spot. For only the remaining candidates, a complex (that is, with a larger amount of computation) discriminator with higher identification performance at a following stage is used to determine whether or not each candidate is a face. Therefore, the processing is fast because there is no need to perform complex determination for all the candidates.

However, the above known examples all apply the face detection to still images and not to detection from moving images.

Japanese Patent Laid-Open No. 2005-174352 employs a method in which, in order to detect faces from a moving image in real time, a temporally unchanged area is determined and excluded from a face detection process. Although this method is effective for speedup, the method does not integrate face identification results across a plurality of frames together. Therefore, improvement in accuracy cannot be expected.

The weights and threshold levels for the neural network in the non-patent document 2, or parameters for defining the rectangle feature amount referred to by the weak discriminators and operational coefficients and threshold levels for performing a discrimination process from the rectangle feature amount in the non-patent document 3 are generally called a recognition dictionary. The recognition dictionary is usually data of a size of several dozen KB to several hundred KB.

A method of adding the metadata is disclosed in Japanese Patent Laid-Open No. 2004-221753. In this method, information about the name of a shooting location and image information are transmitted from a data server placed at the shooting location to a camera via Bluetooth, and the camera stores images in association with the location information.

In photographic images and home video, human faces are indeed important objects of shooting. All the more because of this, for example, if 90% of a group of images consists of images that include faces, it can be readily understood that whether a face is present or not is insufficient as bibliographic information. If one prefers taking photographs (video) of landscapes, whether a person is present or not does not matter in the first place. As such, again it can be understood that whether a person is present or not is insufficient as information for distinction from other information.

Therefore, objects of recognition may not to be limited to faces and human bodies but may expand to various things, for example dogs, cats, cars, and the like.

However, such expansion of objects of recognition involves the processing load multiplied by "the number of expected objects of recognition" compared to the conventional detection limited to faces.

To solve this problem, it may be possible to increase the configuration or enhance the performance as the types of objects of recognition increase. However, this would result in a large configuration, leading to an expensive apparatus.

It may also be possible to perform processing with the configuration remaining unchanged, but the processing time would increase as the types of objects of recognition increase. Especially, since the processing responsiveness of digital cameras and video illustrated above would decrease, their usability would be impaired.

From another viewpoint, if the recognition apparatus is configured as a battery-driven mobile device, a problem arises in that the power consumption increases as the processing load increases. That is, an increase in power consumption causes a reduced operating time of the device, and to avoid this, it may be possible to have a large-capacity battery. However, the weight of the entire device would increase, leading to a reduced portability.

Japanese Patent Laid-Open No. 2004-221753 discloses that information about the name of a shooting location and image information are transmitted from a data server placed at the shooting location to a camera via Bluetooth, and the camera stores images in association with the location information. However, what is recorded is the shooting location, and what are actually captured in the images is not available.

SUMMARY OF THE INVENTION

According to embodiments of the present invention, a data processing apparatus which allows to reduce the data processing load of detecting a specific object of shooting from digital image data is provided.

To solve the above problems, an image processing apparatus of the present invention is capable of communicating with a plurality of servers and includes: a storage unit that stores image data including an object of recognition and a plurality of recognition dictionaries; a communication unit that establishes communication with one of the plurality of servers to receive, from the server with which the communication has been established, designation information designating a recognition dictionary for recognizing the object of recognition included in the image data; and a recognition unit that identifies the recognition dictionary designated in the received designation information from among the plurality of recognition dictionaries stored in the storage unit and uses the identified recognition dictionary to recognize the object of recognition included in the image data.

Further features of the present invention will become apparent from the following description of exemplary embodiments with reference to the attached drawings.

BRIEF DESCRIPTION OF THE DRAWINGS

FIG. 13 is a diagram showing an exemplary configuration of a system that uses the data processing apparatus.

DESCRIPTION OF THE EMBODIMENTS

<First Embodiment>

Figure 1:
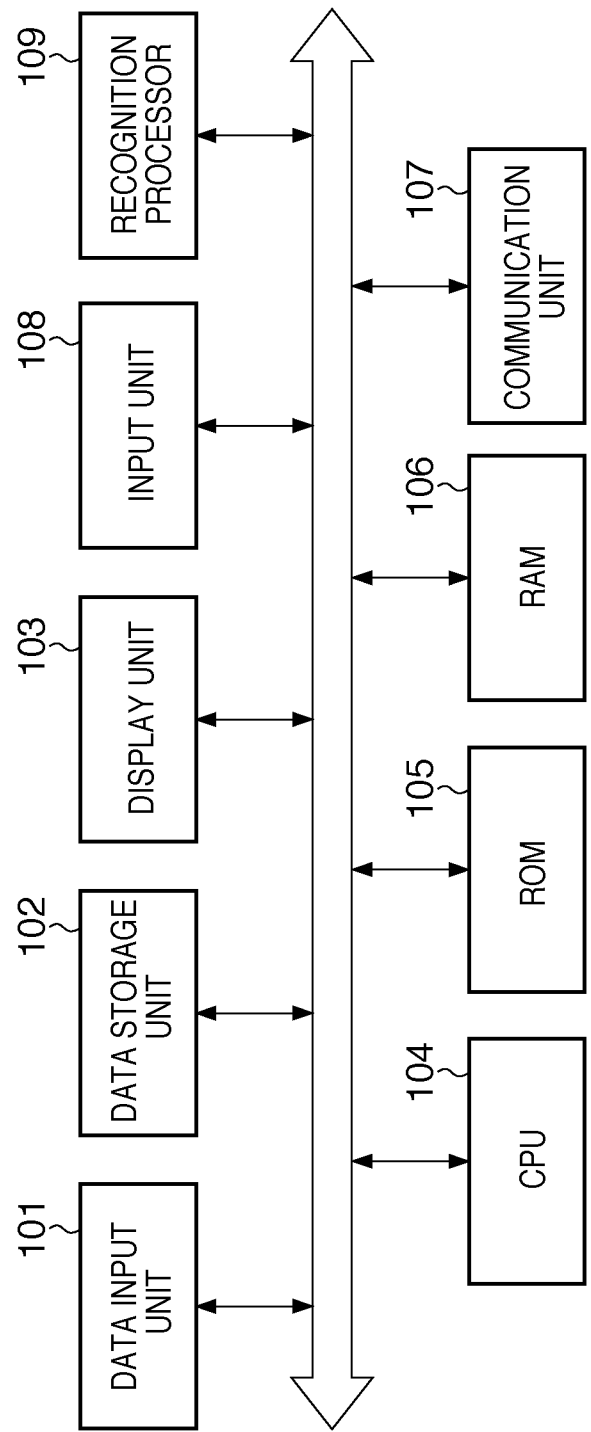
FIG. 1 is a block diagram showing an example of a data processing apparatus that can implement an image processing scheme.

FIG. 1 is a block diagram showing an exemplary configuration of a data processing apparatus that implements an image processing scheme according to a first embodiment.

A data input unit 101 is a component for inputting image data and includes a known sensor device such as a CCD or CMOS. Data input from the data input unit 101 is stored in a RAM 106 or a data storage unit 102 to be described later.

The data storage unit 102 is a component for holding image data and consists of a hard disk, floppy (R) disk, CD-ROM, CD-R, DVD, memory card, CF card, smart media, SD card, memory stick, xD picture card, USB memory, or the like. In addition to image data, the data storage unit 102 can store programs and other data. Alternatively, part of the RAM 106 to be described later may be used as the data storage unit 102. A storage device in an apparatus connected by a communication unit 107 to be described later may also be used via the communication unit 107.

A display unit 103 is a device for displaying images before and after image processing and images such as a GUI, and is typically implemented by a CRT, a liquid crystal display, or the like. Alternatively, the display unit 103 may be an external display device connected via a cable or the like.

An input unit 108 is a component for inputting instructions and data from a user and includes a keyboard and a pointing device. The pointing device corresponds to a mouse, trackball, track pad, tablet, or the like. In the case where the present invention is applied to an apparatus such as a known digital camera device or printer for example, the input unit 108 may be composed of buttons, a dial, and the like. The keyboard may be configured as software (a software keyboard) so that characters are input by operating buttons, a dial, or the above-mentioned pointing device.

Alternatively, as with a known touch screen device, the display unit 103 and the input unit 108 may be implemented as a single device. In this case, a touch screen is used to provide inputs as inputs from the input unit 108.

A CPU 104 concerns all of the processing of the above-described components. A ROM 105 and the RAM 106 provide the CPU 104 with programs, data, work areas, and the like necessary for the processing. If a control program necessary for processing to be described later is stored in the data storage unit 102 or the ROM 105, the control program is executed after being read into the RAM 106. If the apparatus receives a program via a communication unit 107, the program is executed after being recorded in the data storage unit 102 and then read into the RAM 106, or after being directly read from the communication unit 107 into the RAM 106.

Although FIG. 1 shows a configuration with only one CPU, a configuration with a plurality of CPUs is also possible.

The communication unit 107 is an I/F (interface) for communication between apparatuses. The communication unit 107 may conform to, for example, known wired communication schemes such as Ethernet (R), USB, IEEE1284, IEEE1394, and telephone line. The communication unit 107 may also conform to wireless communication schemes such as infrared (IrDA), IEEE802.11a, IEEE802.11b, IEEE802.11g, IEEE802.11n, Bluetooth, and UWB (Ultra Wide Band).

A recognition processor 109 is a component for performing an image data recognition process and detects an object of recognition from image data input by the data input unit 101. An algorithm for this detection may be one indicated in either of the above-described non-patent document 1 or 2. The outline of the recognition process by the recognition processor 109 will be described later.

Here, recognition dictionaries referred to by the recognition processor 109 are stored in the RAM 106, the data storage unit 102, or the ROM 105. If the recognition dictionaries are received via the communication unit 107, the recognition dictionaries are stored in the RAM 106 or the data storage unit 102.

FIG. 1 shows a configuration in which the data input unit 101, the data storage unit 102, the display unit 103, the input unit 108, and the recognition processor 109 are all included in one apparatus. However, these components may be individually connected via communication paths conformable to a known communication scheme to form such a configuration as a whole.

Part or all of the processing of the recognition processor 109 in FIG. 1 may be performed by software instead. In this case, the processing of the recognition processor 109 is performed by the CPU 104 executing a program stored in the ROM 105, the RAM 106, or the data storage unit 102. It is also possible to provide a general signal processor or a general image processor (not shown) so that part of this software processing of the recognition processor is performed by the general signal processor or the general image processor instead.

Although various components other than the above-described components exist in the system configuration, they are not essential parts of the present invention and therefore will not be described.

Figure 2:
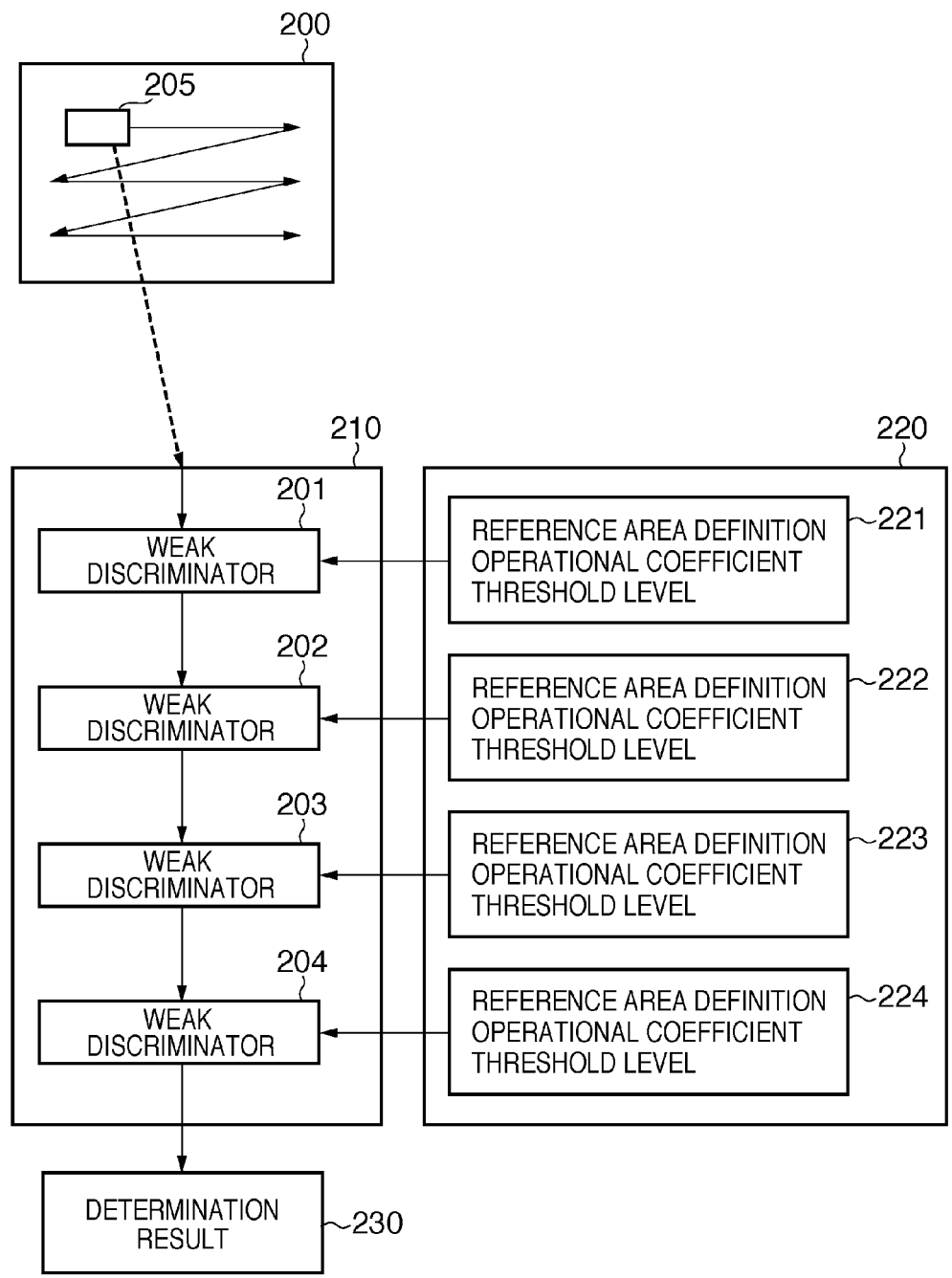
FIG. 2 is a diagram showing an outline of a recognition process.

FIG. 2 is a diagram describing the outline of an algorithm for the recognition process used in the first embodiment. In this embodiment, as in the non-patent document 3, weak discriminators are serially connected to perform the recognition process.

FIG. 2 shows a window area 205 set in recognition-target image data 200. Pixel values in the window area 205 are referred to by a recognition process 210 to be described below, so that it is determined whether the area includes an object of recognition.

The recognition process 210 has output results of four weak discriminators 201 to 204 therein serially connected with weak discriminator parameter sets. The weak discriminators 201 to 204 may be in the same configuration except for different weak discriminator parameter sets (to be described later) they refer to.

Since outputs of the weak discriminator parameter sets 221 to 224 need to be individually received in the recognition process 210, the recognition process 210 is provided with the same number of weak discriminators as the parameter sets. The weak discriminator parameter sets 221 to 224 are each composed of parameters such as a reference area definition, an operational coefficient, and a threshold level.

The output of each of the weak discriminators 201 to 204 is, for example, a value representing true or false for a determination result. For example, the output of this value is configured to be an output of logical OR of a true/false value of a preceding weak discriminator and a true/false value of the weak discriminator in question. In this case, if the output of the preceding weak discriminator is a false value, the weak discriminator in question outputs a false value irrespective of its own determination result. Therefore, the weak discriminator in question may be configured to omit its own processing. Alternatively, the weak discriminators may be configured to sum up and output the number of true values of the weak discriminators.

Further, instead of a binary value of true or false, each weak discriminator may be configured to output a value representing how likely the discrimination is to hold true (likelihood). In this case, the weak discriminator in question may be configured to obtain its own output likelihood by adding a likelihood computed as its own determination result to a likelihood output from the preceding weak discriminator. This operation is basically addition. However, the operation may be configured to include other operations such as weighted averaging and multiplication. The output may also be configured as a combination of the true/false value and the likelihood to be output as a pair.

A determination result 230 in FIG. 2 is data representing this output result, which is a value such as the above-described true/false value or likelihood. In FIG. 2, the processing in each of the weak discriminators 201 to 204 is performed to obtain the determination result 230. However, if the absence of an object of recognition can be determined in any of the weak discriminators 201 to 203, the processing may be configured to be terminated at that point.

The above-described processing for one window area is repeated while the detected window area 205 is moved within the image data 200. This allows detecting objects seen at various positions in the image.

Also, if images scaled with various resolutions with respect to the input image are supplied, objects of various sizes can be obtained and detected in the recognition-target image data 200.

FIG. 2 shows a process flow of the algorithm, and a plurality of weak discriminators like 201 to 204 are not necessarily needed. For example, a single weak discriminator may be configured to be used to repeat the processing while switching among the weak discriminator parameter sets 221 to 224. In this case, as necessary, the recognition dictionary 220 is configured to maintain the number of weak discriminator parameter sets held therein.

Although the recognition dictionary 220 includes the four weak discriminator parameter sets, this is only exemplary. Therefore, any number of weak discriminators may exist. In this configuration, a new object can be detected by changing the recognition dictionary 220 to another recognition dictionary.

Figure 3:
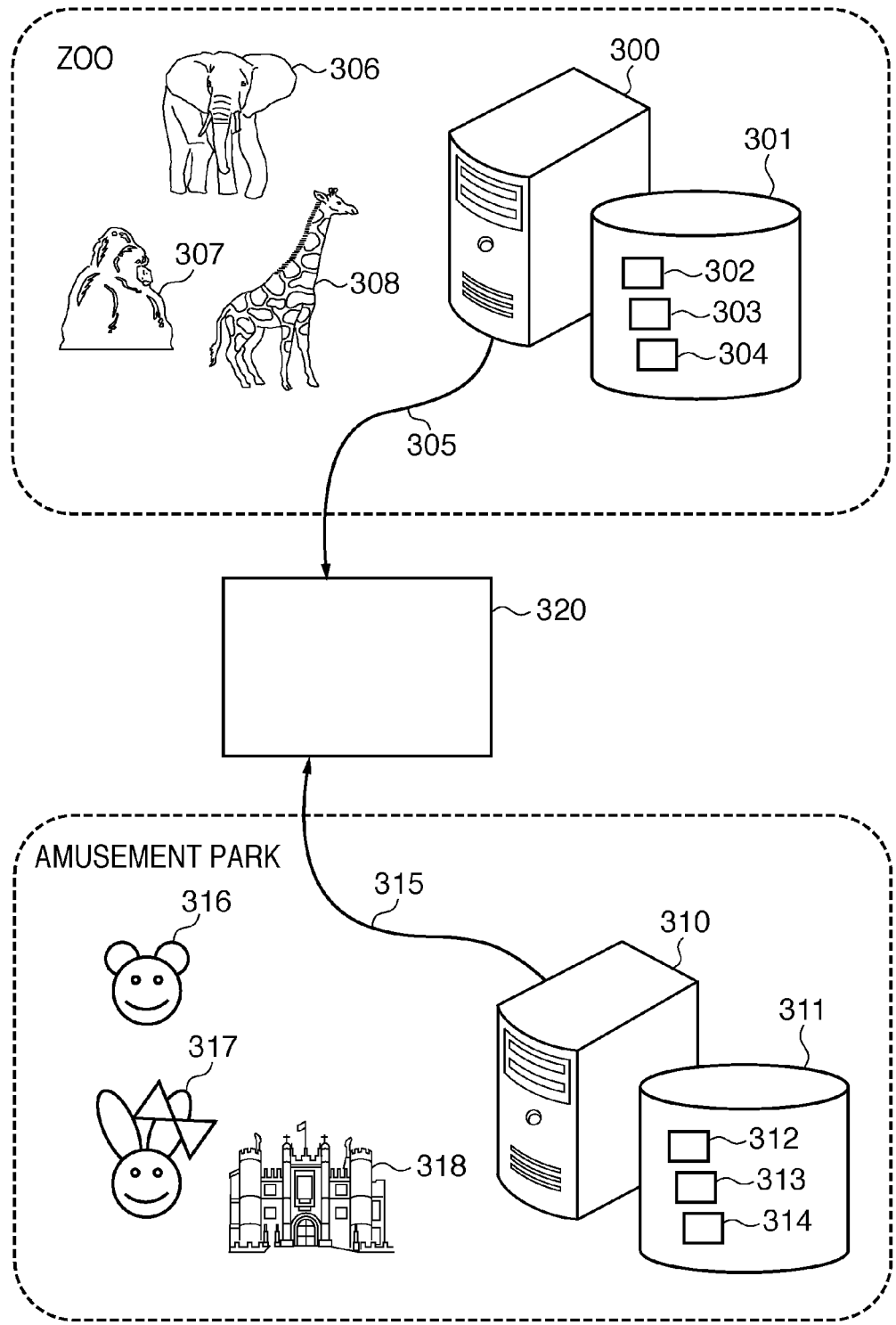
FIG. 3 is a diagram showing an exemplary configuration of a system that uses the data processing apparatus.

FIG. 3 is a diagram showing an exemplary system that uses the data processing apparatus according to the present invention. In FIG. 3, a data processing apparatus 320 can connect to a server 300 or 310. The server 300 or 310 is connected to a storage device 301 or 311. The server 300 manages the storage device 301. The storage device 301 or 311 has recognition dictionaries 302 to 304, or 312 to 314. The server 300 or 310 can communicate with the data processing apparatus 320 via a communication path 305 or 310.

Thus, the configuration of the server 310, the storage device 311, and the communication path 315 is similar to the configuration of the server 300, the storage device 301, and the communication path 305. What is different is that the storage device 311 holds the recognition dictionaries 312 to 314, which are different from the recognition dictionaries in the storage device 301.

The communication paths 305 and 315 may be any communication paths as long as they can connect with the data processing apparatus 320. For example, the communication paths may conform to known wired communication schemes such as Ethernet (R), USB, IEEE1284, IEEE1394, and telephone line. The communication paths are represented by heavy lines in FIG. 3 in order to indicate conceptual communication paths. Therefore, the communication means is not limited to wired schemes but may be wireless communication schemes such as infrared (IrDA), IEEE802.11a, IEEE802.11b, IEEE802.11g, IEEE802.11n, Bluetooth, and UWB (Ultra Wide Band), for example.

The communication paths 305 and 315 may only be capable of connecting with the data processing apparatus 320 individually and do not need to conform to the same communication scheme.

FIG. 3 shows an exemplary image processing system composed of the servers, the communication paths, and the data processing apparatus. It is assumed that the communication path 305 for the server 300 is provided inside or near a zoo, and the communication path 315 for the server 310 is provided inside or near an amusement park. The server 300 itself is also preferably provided inside or near the zoo. Similarly, the server 310 itself is also preferably provided inside or near the amusement park.

It is assumed that the zoo has an elephant 306, a gorilla 307, and a giraffe 308, and the amusement park has a character 316 and a character 317 and has a pavilion 318 standing therein. The recognition dictionaries 302 to 304 and 312 to 314 are configured to correspond to the objects of shooting 306 to 308 and 316 to 318 with which the zoo and the amusement park are interspersed, respectively. For example, the recognition dictionaries are configured as follows.

recognition dictionary 302: recognition dictionary of the elephant 306 recognition dictionary 303: recognition dictionary of the gorilla 307 recognition dictionary 304: recognition dictionary of the giraffe 308 recognition dictionary 312: recognition dictionary of the character 316 recognition dictionary 313: recognition dictionary of the character 317 recognition dictionary 314: recognition dictionary of the pavilion (building) 318

When a user goes to the zoo carrying the data processing apparatus 320, the user connects the data processing apparatus 320 to the server 300 via the communication path 305 provided inside or near the zoo. The connection may be made via a wired cable or wirelessly. The connection causes communication to be established between the data processing apparatus 320 and the server. The data processing apparatus 320 thus receives data of the recognition dictionaries 302 to 304 held in the storage device 301 managed by the server 300. The communication procedure (such as a protocol) at this point may be arbitrary. A detailed process flow in the data processing apparatus 320 here will be described later.

The data processing apparatus 320 takes an image of the elephant 306, the gorilla 307, or the giraffe 308 in the zoo. The data processing apparatus 320 uses the recognition dictionaries 302 to 304 to recognize the shot image, and stores the recognition result in association with the shot image or video. That is, the recognition result is stored in the data processing apparatus 320, for example in the data storage unit 102 in FIG. 1.

Similarly, when a user goes to the amusement park carrying the data processing apparatus 320, the user connects the data processing apparatus 320 to the server 310 via the communication path 315 provided inside or near the amusement park. The data processing apparatus 320 receives data of the recognition dictionaries 312 to 314 held in the storage device 311 managed by the server 310 and takes an image of the character 316, the character 317, or the pavilion 318 in the amusement park. The data processing apparatus 320 uses the recognition dictionaries 312 to 314 to recognize the shot image, and stores the recognition result in association with the shot image or video.

In the perspective of FIG. 3 as a whole, there are six types of objects of recognition in the zoo and the amusement park in total: the elephant 306, the gorilla 307, the giraffe 308, the character 316, the character 317, and the pavilion 318. According to the configuration of the present invention, the recognition dictionaries can be narrowed down to appropriate dictionaries depending on the location: three types of dictionaries for the zoo and three types of dictionaries for the amusement park. Therefore, the amount of processing can be advantageously reduced compared to the case of performing the recognition process by using all the six types of recognition dictionaries.

Figure 5:
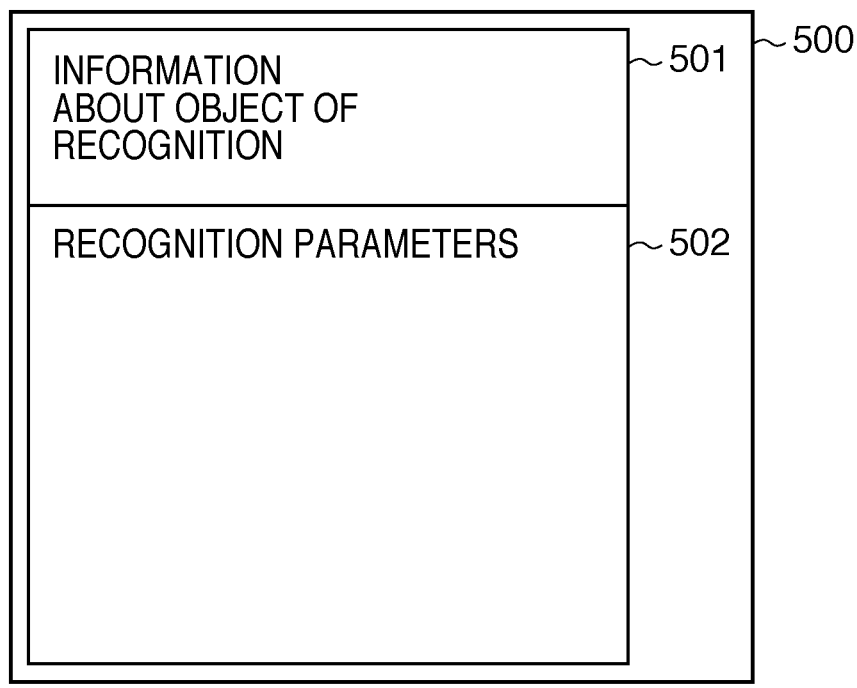
FIG. 5 is a diagram showing an exemplary configuration of a recognition dictionary.

FIG. 5 is a conceptual diagram showing a configuration of a recognition dictionary in this embodiment.

In FIG. 5, a recognition dictionary 500 includes information about an object of recognition 501 and recognition parameters 502.

The recognition parameters 502 are parameters used for the processing of the recognition processor 109 in FIG. 1, which may, for example, the weights and threshold levels for the neural network in the non-patent document 2. The recognition parameters 502 may also be the parameters for defining the rectangle feature amount referred to by the weak discriminators, and the operational coefficients, threshold levels, and the like for performing discrimination processing from the rectangle feature amount, in the non-patent document 3. These recognition parameters 502 are stored in a form that can be interpreted by the recognition processor 109.

The information about the object of recognition 501 is information for identifying an object of shooting that can be detected with the recognition parameters 502. For example, for the recognition dictionaries 302 to 304 and 312 to 314 in FIG. 3 that represent instances of the recognition dictionary 500, the following information is stored.

information about the object of recognition 501 included in the recognition dictionary 302: information representing the elephant 306 information about the object of recognition 501 included in the recognition dictionary 303: information representing the gorilla 307 information about the object of recognition 501 included in the recognition dictionary 304: information representing the giraffe 308 information about the object of recognition 501 included in the recognition dictionary 312: information representing the character 316 information about the object of recognition 501 included in the recognition dictionary 313: information representing the character 317 information about the object of recognition 501 included in the recognition dictionary 314: information representing the pavilion 318

The above-described recognition result includes metadata about the object of shooting generated from the information about the object of recognition 501, and the metadata is stored in association with the shot image or video. The information about the object of recognition 501 may be any information sufficient for generating the metadata about the object of shooting later.

For example, the metadata about the object of shooting is stored as character string data in the information about the object of recognition 501. Alternatively, a unique identifier (ID) representing the object of shooting may be used as the metadata. In this case, for presenting the metadata to the user, it is desirable to separately provide a matching table of IDs and character strings representing objects of shooting: an ID is converted into a character string representing the object of shooting, and the character string resulting from the conversion is presented to the user.

The recognition dictionary 500 in FIG. 5 may be in any format. In FIG. 5, the recognition dictionary 500 includes the information about the object of recognition 501 and the recognition parameters 502. This only indicates a conceptual configuration, that is, the recognition dictionary 500 is composed of a pair of the information about the object of recognition 501 and its corresponding recognition parameters 502. Therefore, the information about the object of recognition 501 and the recognition parameters 502 do not necessarily need to be stored in the same file. As long as the information about the object of recognition 501 is associated with its corresponding recognition parameters 502, they may be stored in separate files. The information about the object of recognition 501 and the recognition parameters 502 may also be stored in known database means.

Although the recognition dictionary 500 includes only the information about the object of recognition 501 and the recognition parameters 502 in FIG. 5, this indicates the minimum configuration in this embodiment. Therefore, the recognition dictionary 500 may be configured to further include other data as necessary.

(Processing in Data Processing Apparatus)

Figure 6:
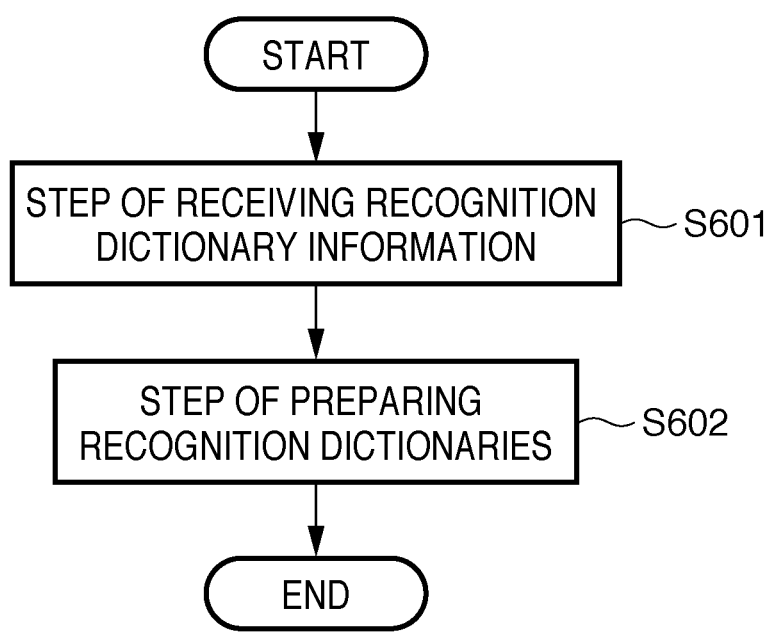
FIG. 6 is a flow diagram showing a flow of a process of receiving recognition dictionary information in the data processing apparatus.

FIG. 6 is a flow diagram showing a process flow in which the data processing apparatus according to the present invention receives recognition dictionary information. The process of FIG. 6 is configured to be started in the following manner. In FIG. 3 for example, once the data processing apparatus 320 connects to the communication paths 305 or 315, the start of communication is triggered, in response to which the process is started. However, the process may be configured to be started by the user instructing to start the process by operating the input unit 108 in FIG. 1 of the data processing apparatus 320.

In a step of receiving recognition dictionary information in step S601, the input unit 108 of the data processing apparatus 320 receives designation information about recognition dictionaries from a server. In this embodiment, if the data processing apparatus 320 connects to the server 300 via the communication path 305 for example, the server 300 transmits data of the recognition dictionaries 302 to 304 managed by the server 300 to the data processing apparatus 320. The data processing apparatus 320 receives the data of the recognition dictionaries 302 to 304 and stores the received data in the data storage unit 102 or the RAM 106. Similarly, if the data processing apparatus 320 connects to the server 310 via the communication path 315, the server 310 transmits data of the recognition dictionaries 312 to 314. The data processing apparatus 320 stores the received data in the data storage unit 102 or the RAM 106.

In a step of preparing recognition dictionaries in step S602, the CPU 104 of the data processing apparatus 320 performs processing necessary for performing the recognition process by using the received dictionary data. To prepare for a shooting process and the like to be described later, the CPU 104 checks the number of recognition dictionaries stored in the data processing apparatus 320, sets the number as a variable NumOfActiveDic, and holds the variable in the data storage unit 102. If the storage unit consists of the nonvolatile RAM 106, the variable may be stored in the RAM 106. The variable NumOfActiveDic is referred to in the shooting process to be described later. The CPU 104 generates a list of the recognition dictionaries, which is also referred to in the shooting process to be described later. If any other processing is necessary as preparation for the shooting process to be described later, the CPU 104 performs the necessary processing in this step. Upon completion of the step of preparing the recognition dictionaries S602, the process in FIG. 6 ends.

Figure 7:
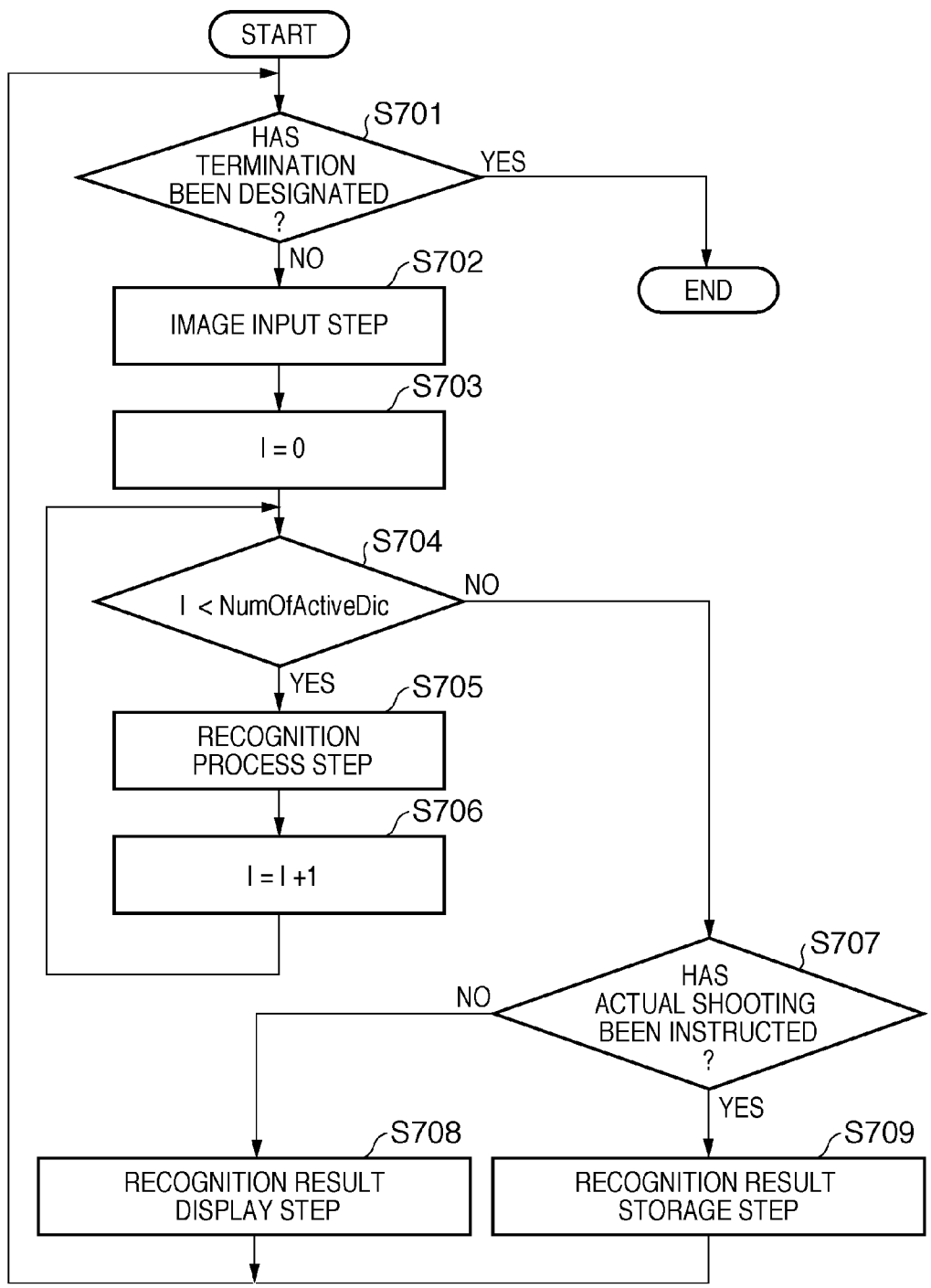
FIG. 7 is a flow diagram showing a flow of the recognition process in the data processing apparatus.

With reference to FIG. 7, the shooting process will be described. First, step S701 denotes determination as to whether or not the process ends. This is processing of determining whether or not termination of an image capturing mode has been instructed. For example, this is determined for terminating the shooting process if the user has operated the input unit 108 to instruct to terminate the image capturing mode and transition to a replay mode. In a desirable configuration, the user's mode transition designation is asynchronous with the process described in FIG. 7. In the asynchronous case, for example, in response to the user's instruction, the CPU 104 sets a flag indicating termination and holds the flag in the RAM 106. The CPU 104 refers to the flag in step S701 to determine whether or not to terminate the image capturing mode. If the determination in step S701 results in true (if the mode transition has been instructed by the user), the process ends. If the determination results in false, the process transitions to step S702.

In step S702, image data is input through the data input unit 101. The CPU 104 stores the data input to the data input unit 101 in the RAM 106 or the data storage unit 102.

In step S703, the CPU 104 initializes a loop counter variable I to 0 in order to perform initialization processing for an iterative process in steps S704 to S706 that follow.

In step S704, processing of determining whether to terminate the iterative process is performed. NumOfActiveDic is a variable representing the number of valid dictionaries held in the data processing apparatus 320. In this embodiment, NumOfActiveDic is set in the process in S601 to S602 already described in FIG. 6.

In step S705, a recognition process step is performed. The recognition process takes, as an input, the image data input through the data input unit 101 and stored in the RAM 106 in step S702. According to the process described in the flow diagram of FIG. 6, the CPU 104 identifies an i-th dictionary from the list of received recognition dictionaries. The recognition processor 109 uses the identified recognition dictionary to perform the recognition process for an object of shooting in the input image data.

The CPU 104 stores the recognition result in the recognition process step in step S705 in the RAM 106 or the data storage unit 102 in a form that allows knowing which recognition dictionary was used for the detection. As the minimum configuration, information indicating whether or not an object of recognition corresponding to that dictionary was detected is sufficient to configure the present invention. However, information about how many instances of the object of recognition were detected and the location of each instance of the object of recognition in the image is desirably stored for each object of recognition. In step S706, the CPU 104 increments the loop counter variable I by one and returns to step S704.

The above iterative process is repeated for the number of valid dictionaries held in the data processing apparatus 320. If the determination in step S704 results in false, the CPU 104 transitions to processing in step S707.

In step S707, the CPU 104 determines whether or not actual shooting has been instructed from the user. In a desirable configuration, the instruction of actual shooting from the user is provided with user's preferred timing. Therefore, the reception of the instruction of actual shooting from the user and the process in the data processing apparatus of FIG. 7 are asynchronously configured. That is, in response to the instruction from the user, a process of receiving an instruction of actual shooting from the user sets a flag indicating the presence of the shooting instruction and holds the flag in the RAM 106 or the data storage unit 102. Also in this step, the CPU 104 is configured to refer to the flag and determine whether actual shooting has been instructed. This flag needs to be configured to be reset in a step of storing a shooting result. Therefore, in this embodiment, the flag is configured to be reset in processing in step S709 to be described later.

If the determination in step S707 results in true (actual shooting has been instructed from the user), the CPU 104 transitions to processing in step S709. If the determination results in false, the CPU 104 transitions to processing in step S708.

Step S708 denotes processing in the case where actual shooting has not been instructed. In this case, in a desirable configuration, a tentative shooting image (a preview image) is output on the display unit 103 as an aid for the user's shooting. Here, the CPU 104 of the data processing apparatus 320 is configured to display the result of the recognition process performed in the previous iterative process in steps S704 to S706 on the display unit 103.

Figure 11:
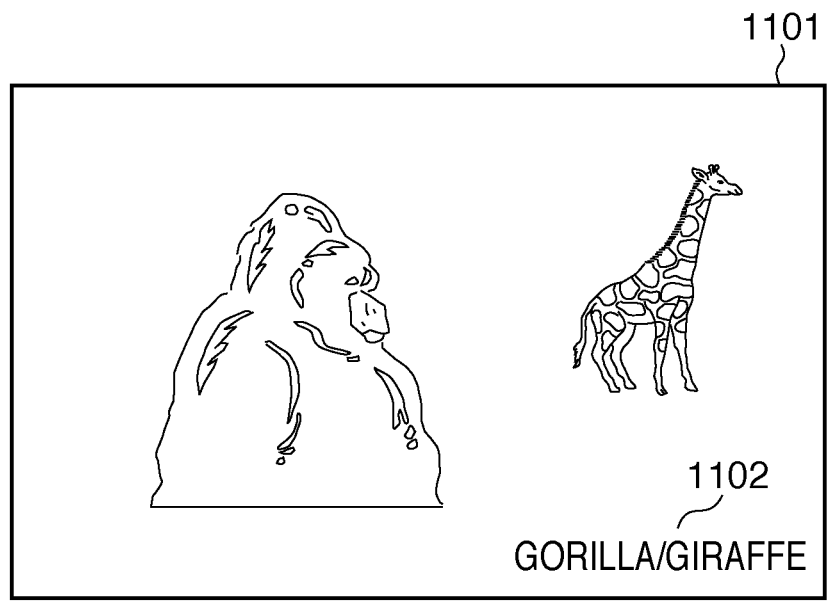
FIG. 11 is a diagram showing an exemplary display of a recognition result.

FIG. 11 is a diagram showing an exemplary display of this recognition result. FIG. 11 shows a display image 1101 on the display unit 103. A character string of gorilla/giraffe 1102 is a display of a character string representing the recognition result. The CPU 104 generates the character string 1102 based on the information about the object of recognition 501 stored in the recognition dictionaries.

Figure 12:
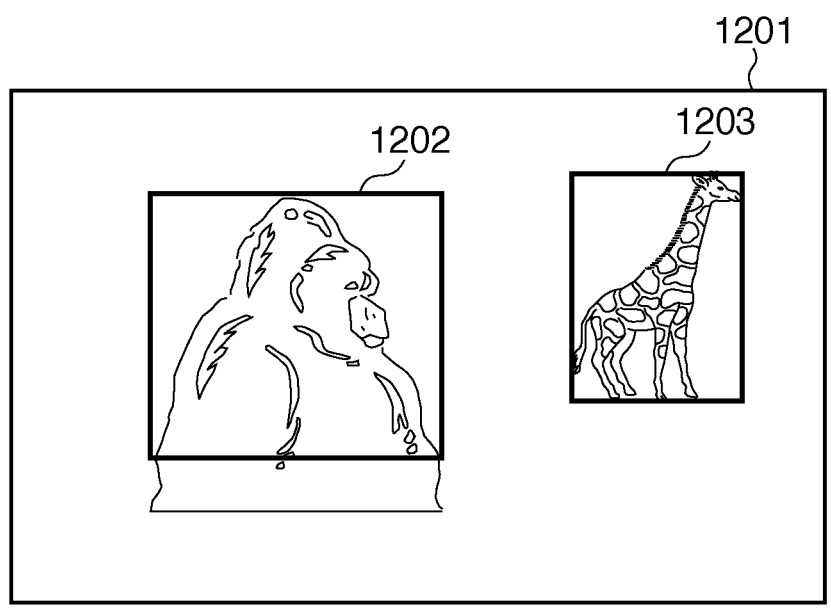
FIG. 12 is a diagram showing another exemplary display of the recognition result.

FIG. 12 shows another exemplary display of the recognition result. FIG. 12 shows a display image 1201 on the display unit 103, where a display of a recognized object of shooting 1202 indicates a detection position of the gorilla, and a display of a recognized object of shooting 1203 indicates a detection position of the giraffe. In this configuration, the detection positions of the objects of shooting are recorded in step S705 above.

Once the processing in step S708 is finished, the CPU 104 returns to the processing in step S701. Step S709 denotes processing in the case where the user has instructed actual shooting. In actual shooting, the CPU 104 stores the image data input through the data input unit 101 in the data storage unit 102 according to a predetermined format. In this embodiment, metadata is generated from the recognition result of the iterative processing in steps S704 to S706 above, and the generated metadata and the shot image data are stored in association with each other.

The metadata and the image data may be associated with each other in any manner as long as the corresponding metadata can be reached from the image data. As an example, the metadata is stored in an image data file according to a file format standard for storing the image data. For example, if the file format for storing the image data is a known Exif standard, the metadata is stored in a MakerNote tag or the like. Alternatively, the metadata may be stored in a file separate from a file storing the image data. Further, data that associates the image data file and the metadata file may be included in a file, which may be stored in the data storage unit 102.

The image data file and the metadata file may have a common part in their file names (for example, part of their file names other than their extensions). In this manner, generation of a metadata file name from an image data file name may be facilitated. Further, known database means may be provided so that the metadata and the like are stored in the database means.

Thus, this embodiment has the following configuration: at a location where the data processing apparatus inputs data, necessary recognition dictionaries are distributed from the server to the data processing apparatus, and the distributed recognition dictionaries are used to perform recognition upon input of image data. In this manner, the number of recognition dictionaries used by the data processing apparatus in the recognition process can be restrained, and a reduction of the processing load on the data processing apparatus can be realized. That is, this configuration can advantageously reduce the processing time or reduce the circuit size of a recognition process unit. In addition, a storage area for storing the recognition dictionaries can be advantageously reduced.

<Second Embodiment>

The first embodiment has been illustrated for the example of only receiving recognition dictionaries from the server. A second embodiment will describe an example of performing processing of determining received recognition dictionaries as invalid according to a condition and deleting the recognition dictionaries.

Figure 8:
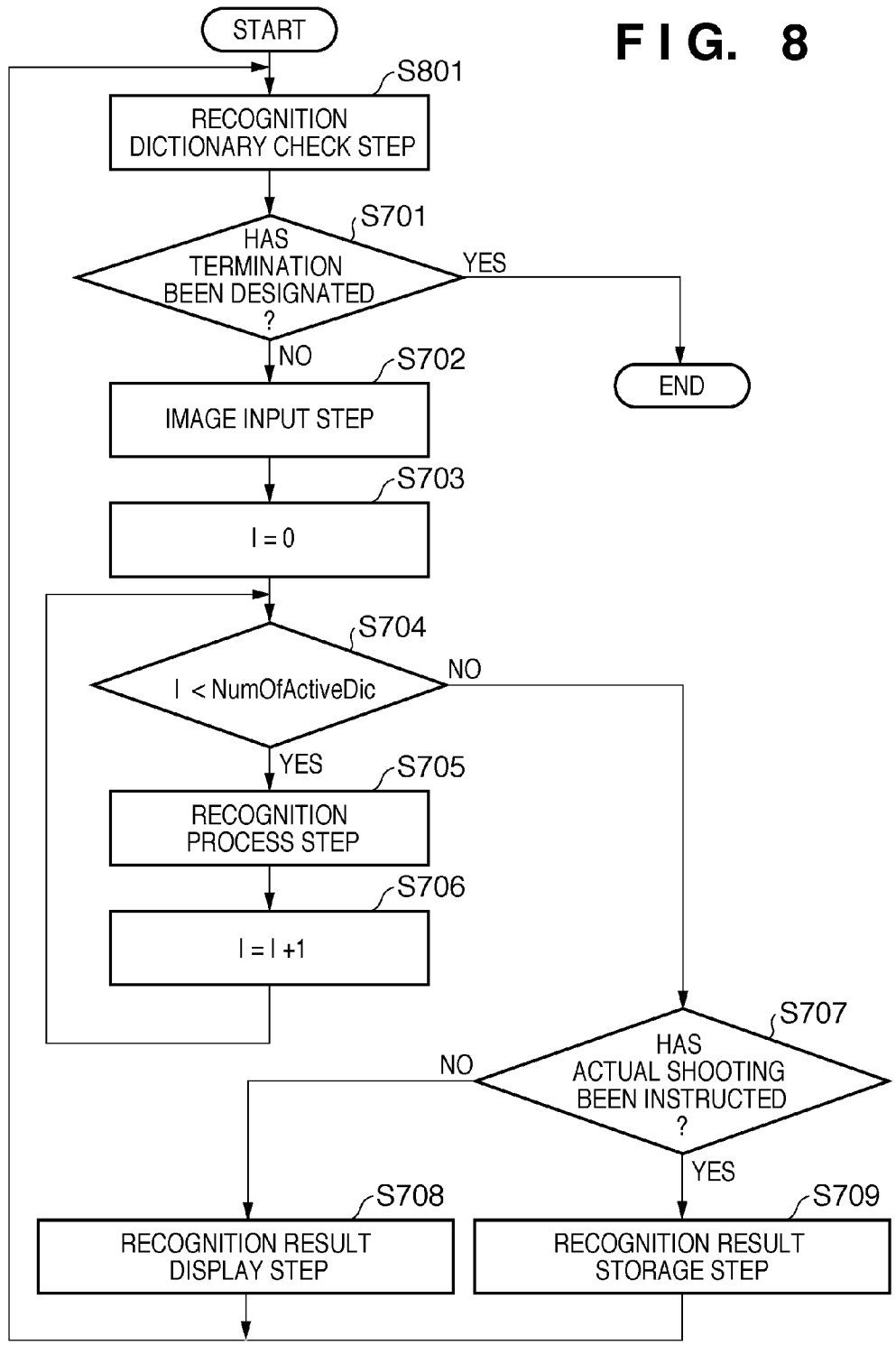
FIG. 8 is a flow diagram showing a flow of the recognition process in the data processing apparatus.

FIG. 8 is a diagram showing a process flow in the second embodiment. In FIG. 8, the same portions as described in the first embodiment of FIG. 7 are given the same numerals as in FIG. 7 and will not be described.

Figure 9:
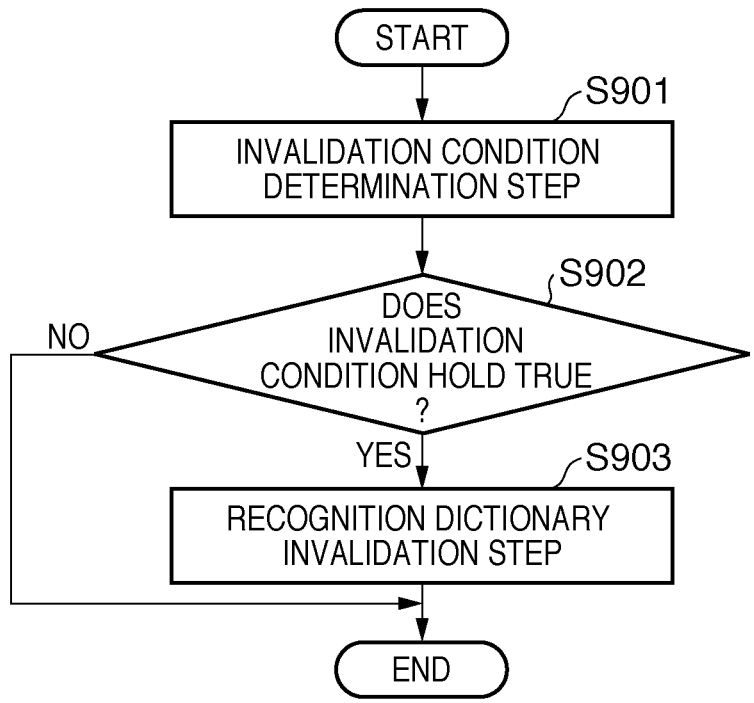
FIG. 9 is a flow diagram showing a process flow of a recognition dictionary check step.

In FIG. 8, before the process flow in step S701, a process of a recognition dictionary check step in step S801 is performed. The process of the recognition dictionary check step will be described with reference to a flow diagram in FIG. 9.

In step S901, for each recognition dictionary in the data processing apparatus 320, the CPU 104 performs a determination process according to an invalidation determination condition. Exemplary invalidation conditions may be as follows.

a) invalidate if a specified time has passed since the reception of the recognition dictionary.

b) invalidate if a specified number of shots has been reached since the reception of the recognition dictionary.

c) when the communication path 305 or 315 in FIG. 3 is a wireless communication path, invalidate if communication with the communication path of the server that distributed the recognition dictionary is out of the wireless communication area.

d) when the communication path 305 or 315 in FIG. 3 is a wireless communication path, invalidate if communication with the communication path of the server that distributed the recognition dictionary is out of the communication area, and a specified time has passed or a specified number of shots has been reached.

In the case of the above invalidation determination condition a), the configuration of FIG. 1 is provided with a time management unit (not shown) for managing time. Also, the configuration needs to allow the reception times of dictionaries to be known. Therefore, in the step of receiving the recognition dictionary information S601 or the step of preparing the recognition dictionaries S602 in FIG. 6, the CPU 104 is configured to obtain the time at which each recognition dictionary is received from the time management unit and store the obtained time in association with the dictionary. In this case, in step S901, the current time is obtained from the time management unit and the reception time of the recognition dictionary is obtained, and whether the specified time has passed is determined. The specified time may be preset, for example to 24 hours.

In the case of the above b) "invalidate if a specified number of shots has been reached since the reception of the recognition dictionary," variables for counting the numbers of shots are internally provided. The CPU 104 stores the variables in the RAM 106 or the data storage unit 102. In this configuration, the variables are initialized in the step of receiving the recognition dictionary information S601 or the step of preparing the recognition dictionaries S602 in FIG. 6: the variables for counting the number of shots are updated in the recognition result storage step S709 in FIG. 8. Then in step S901, the CPU 104 obtains a variable for counting the number of shots to determine whether the specified number of shots have been taken. The specified number may be preset, for example to 200 shots.

In the case of the above c) "in wireless communication, invalidate if communication with the communication path of the server that distributed the recognition dictionary is out of the communication area," step S901 is configured such that the state of the reception level of the wireless communication in the communication unit 107 is checked. The CPU 104 checks the reception level to determine whether the reception level is below a predetermined value and therefore the communication is out of the wireless communication area. That is, step S902 is configured such that the determination results in true if the reception level is below the predetermined value, or false if not.

In the case of the above d) "in wireless communication, invalidate if communication with the communication path of the server that distributed the recognition dictionary is out of the communication area, and a specified time has passed or a specified number of shots has been reached," step S901 is configured such that the CPU 104 checks the state of the wireless communication and resets the times or the variables for the numbers of shots. If determination is made according to the invalidation condition based on time, the configuration of FIG. 1 is provided with a time management unit as in the case of a). If invalidation is determined based on the number of shots, variables for counting the numbers of shots are provided. In step S901, the CPU 104 makes determination according to the invalidation determination condition based on time or the number of shots. In step S902 that follows, the CPU 104 branches the process depending on whether the invalidation holds true. If the invalidation holds true, the process transitions to step S903. Otherwise the process of FIG. 9 ends.

In step S903, the valid recognition dictionary is invalidated. In this embodiment, the list of received recognition dictionaries is generated in step S602 to perform the process of steps S704 to S706 (FIG. 8). Therefore, the invalidated dictionary is deleted from this dictionary list, and the variable NumOfActiveDic representing the total number of valid dictionaries is updated by decrementing by one.

At this point, the data itself of the recognition dictionary is configured to be deleted as necessary.

Thus, according to this embodiment, not only necessary recognition dictionaries are distributed from the server to the data processing apparatus at a location where the data processing apparatus inputs data, but also dictionaries can be automatically deleted based on a predetermined condition. In the first embodiment, the user needs to designate and delete a recognition dictionary such as by operating a GUI. However, in the second embodiment, whether a recognition dictionary is invalid is determined based on a predetermined invalidation condition, and the recognition dictionary determined as invalid is deleted without the user's intervention. This allows further improvement in usability compared to the first embodiment.

<Third Embodiment>

Figure 10:
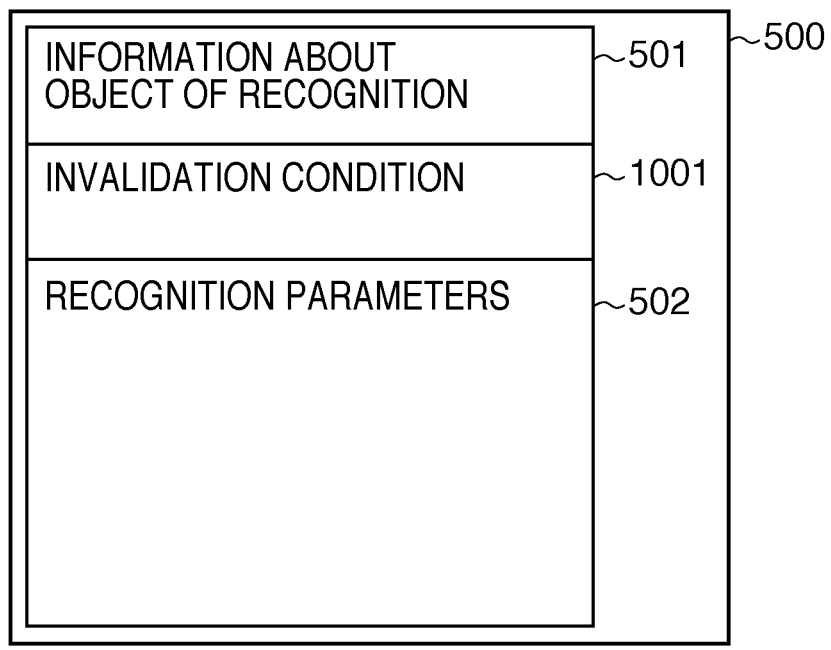
FIG. 10 is a diagram showing an exemplary configuration of a recognition dictionary.

In a third embodiment, the server has a plurality of types of recognition dictionaries and controls an invalidation condition on the recognition dictionaries. FIG. 10 is a diagram showing a configuration of a recognition dictionary used in the third embodiment. The same portions as in FIG. 5 are given the same numerals and will not be described.

In the first embodiment, once the data processing apparatus is connected to the server, designation information about recognition dictionaries are transmitted from the server depending on the connected communication path. In the third embodiment, data itself of designated recognition dictionaries is transmitted from the server. As such, the data processing apparatus does not need to store a plurality of recognition dictionaries, and therefore a smaller data storage unit is required for the storage.

The invalidation of recognition dictionaries performed in the second embodiment is also performed in the third embodiment, but in this case the server performs the invalidation. Again in the third embodiment, as in the second embodiment, for example, a recognition dictionary can be invalidated so as not to be transmitted to the data processing apparatus such as if a predetermined time has passed since the data processing apparatus received the recognition dictionary or if a predetermined number of shots has been reached since the data processing apparatus received the recognition dictionary. That is, the use of recognition dictionaries can be controlled according to a condition desired by the server that provides the recognition dictionaries.

FIG. 10 shows an area 1001 in which an invalidation condition is written. In this configuration, the specified value used in the second embodiment is written in this area, and in step S901 (FIG. 9), the invalidation is determined by referring to the specified value.

The recognition dictionaries do not need to have a uniform invalidation condition, so that the invalidation condition may vary among the recognition dictionaries. In this case, the data processing apparatus is configured to be capable of addressing any of the several invalidation conditions listed in the second embodiment.

The area 1001 for writing the invalidation condition may be in any data format. Generally, a known structured data format such as XML is used to write the invalidation condition.

Thus, according to this embodiment, the data processing apparatus does not need to have a predetermined condition.

In this case, the present invention can also be applied to a case where all or part of a recognition dictionary is encrypted with known cryptographic means or the like. Specifically, when the data communication apparatus connects to the server through wireless communication, a recognition dictionary is encrypted with a known public-key cryptosystem. A cryptographic key is obtained from the server at regular intervals so that the recognition dictionary can be decrypted. In such a configuration, discarding the cryptographic key once the communication between the server can invalidate the recognition dictionary and the data processing apparatus is out of the communication area.

<Fourth Embodiment>

In a fourth embodiment, a description will be made of an example in which the data processing apparatus holds recognition dictionaries in advance.

Figure 4:
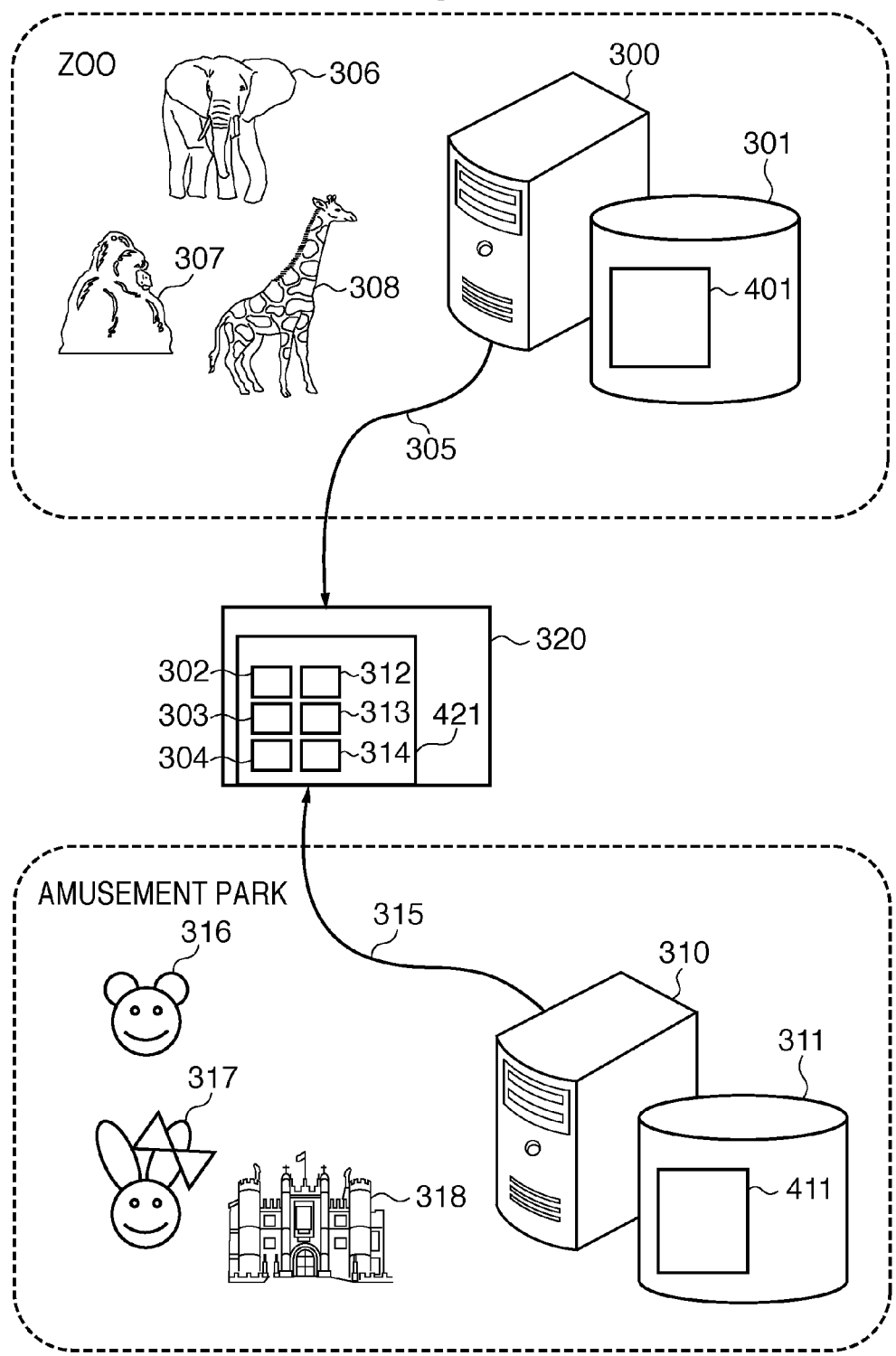
FIG. 4 is a diagram showing an exemplary configuration of a system that uses the data processing apparatus.

FIG. 4 is a diagram showing a system that uses the data processing apparatus according to this embodiment. In FIG. 4, the same portions as in FIG. 3 of the first embodiment are given the same numerals as in FIG. 3.

In FIG. 4, the server 300 holds recognition dictionary designation information 401 in the storage device 301. Similarly, the server 310 holds recognition dictionary designation information 411 in the storage device 311. The server 300 or 310 refers to the recognition dictionary designation information 401 or 411 to generate designation information that designates recognition dictionaries corresponding to the connected communication path (305 or 315).

The data processing apparatus 320 holds the recognition dictionaries 302 to 304 and 312 to 314 in advance in a storage unit 421 internal to or connected to the apparatus. The storage unit 421 consists of the data storage unit 102, the RAM 106, or the ROM 105 in FIG. 1.

The recognition dictionary designation information 401 lists information identifying the three recognition dictionaries 302 to 304. For example, if the recognition dictionaries are stored as files, identifiers (such as file names) corresponding to the recognition dictionaries 302 to 304 may be used. Preferably, the information about the object of recognition 501 in FIG. 5 is listed as the information identifying each recognition dictionary.

If the data processing apparatus 320 receives the recognition dictionary designation information 401, the data processing apparatus 320 refers to the recognition dictionary designation information 401 and, based on the information listed therein, identifies the recognition dictionaries 302 to 304 from the storage unit 421. The data processing apparatus 320 uses the three dictionaries to perform the recognition process for shot images.

Similarly, the recognition dictionary designation information 411 lists information identifying the three recognition dictionaries 312 to 314. If the data processing apparatus 320 receives the recognition dictionary designation information 411, the data processing apparatus 320 identifies the recognition dictionaries 312 to 314 from the storage unit 421 and uses the identified recognition dictionaries to perform the recognition process.

Thus, as described above, in this embodiment, objects of recognition can be restricted depending on the location and situation by communicating the recognition dictionary designation information depending on the location and situation. This allows reducing the processing load.

In the scheme according to this embodiment, a set of recognition dictionaries needs to be provided in advance in the data processing apparatus. This set may be distributed in advance in a form like a ROM cartridge, for example. The set may also be stored in a known mass storage memory card such as an SD card.

Generally, to transfer one recognition dictionary, data of several KB to several dozen KB needs to be transferred. In contrast, several bytes to several hundred bytes are sufficient for information identifying one recognition dictionary. Therefore, compared to the first embodiment, the scheme according to this embodiment can advantageously reduce the amount of communication between the server and the data processing apparatus. This is more than just a reduction of the communication time. That is, considering that the data processing apparatus in this embodiment is applicable to a mobile device, there is a further advantage that the operation time of the communication unit can be reduced, resulting in a reduction of the battery power consumption of the device.

<Fifth Embodiment>

FIG. 13 is a diagram showing a system according to a fifth embodiment. In FIG. 13, the same portions as in FIG. 3 of the third embodiment are given the same numerals. In the example of FIG. 13, the server is provided with a communication path 1301 in addition to the communication path 315. The communication path 1301 can communicate with the data processing apparatus 320 at a location, such as the outside of the amusement park facility, subjected to conditions different from conditions for the communication path 315.

In the fifth embodiment, different conditions on distributing recognition dictionaries are set for connection via the communication path 315 and connection via the communication path 1301.

Specifically, if recognition dictionaries are distributed to the data processing apparatus 320 via the communication path 315 provided inside or near the target facility, the user can use the recognition dictionaries free of charge. However, if recognition dictionaries are distributed to the data processing apparatus 320 via the communication path 1301, the use of the recognition dictionaries is charged and the user is billed. The billing may be in any known manner.

By configuring as above, the user's visit to the facility (the amusement park in the case of FIG. 13) can be given value. In FIG. 13 of this embodiment, the server 310 has been described as a single server. However, this is only conceptual, and what is intended by the present invention is the same even with a plurality of servers that distribute the same recognition dictionaries.

Thus, according to this embodiment, in a system in which recognition dictionaries can be distributed from the same server via a plurality of paths, different billing information is set for different paths. This allows increasing added values of visiting a place where the recognition dictionaries are required.

<Sixth Embodiment>

In the fifth embodiment, the same recognition dictionaries are distributed via the communication paths 315 and 1301 in FIG. 13. In a system according to a sixth embodiment, the dictionary data itself need not be the same between the communication paths 315 and 1301 as long as objects of recognition are the same. Therefore, for example, the invalidation condition referred to in the examples of the second and third embodiments may be configured to vary. In this case, the invalidation condition is relaxed for the communication path 315 so that receiving via the communication path 315 is more advantageous than receiving via the communication path 1301.

Also, the recognition accuracy achieved with the recognition parameters may be configured to vary. In this case, for example, the recognition accuracy is increased or the amount of processing is reduced for the communication path 315 so that receiving via the communication path 315 is more advantageous than receiving via the communication path 1301. An exemplary way for reducing the amount of processing may be reducing the processing load by reducing the number of weak discriminators as described in FIG. 2.

To vary the configuration in such a manner, relevant data may be rewritten at the time of distributing recognition dictionaries, or modified recognition dictionaries may be provided in advance in the storage device and selected depending on the path.

Thus, according to this embodiment, in a system in which recognition dictionaries can be distributed from the same server via a plurality of paths, different paths can have different settings for the usage condition, the recognition accuracy, or the amount of processing. This allows increasing added values of the user's actual visit to a place where the recognition dictionaries are required.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241881, filed Oct. 20, 2009, which is hereby incorporated by reference herein in its entirety.

What is claimed is:

1. An image processing apparatus capable of communicating with a plurality of servers, the image processing apparatus comprising:
a storage unit for storing image data including an object of recognition;
a communication unit for establishing communication with one of the plurality of servers to receive, from the server with which the communication has been established, a recognition dictionary for recognizing the object of recognition included in the image data;
a recognition unit for using the received recognition dictionary to recognize the object of recognition included in the image data; and
an invalidation determination unit for determining whether or not a predetermined time has passed since the reception of the recognition dictionary by said communication unit, and for invalidating the recognition dictionary if the predetermined time has passed.

2. The image processing apparatus according to claim 1, further comprising a display unit for displaying information about a result of recognition by said recognition unit in association with the image data.

3. An image processing apparatus capable of communicating with a plurality of servers, the image processing apparatus comprising:
a storage unit for storing image data including an object of recognition and a plurality of recognition dictionaries;
a communication unit for establishing communication with one of the plurality of servers to receive, from the server with which the communication has been established, designation information designating a recognition dictionary for recognizing the object of recognition included in the image data;
a recognition unit for recognizing the object of recognition included in the image data using the recognition dictionary designated in the received designation information from the plurality of recognition dictionaries stored in said storage unit; and
an invalidation determination unit for determining whether or not an invalidation determination condition is met for the recognition dictionary, and for invalidating the recognition dictionary if the invalidation determination condition is met,
wherein the invalidation determination condition is that a predetermined number of shots has been reached since the reception of the recognition dictionary by said communication unit.

4. An image processing apparatus capable of communicating with a plurality of servers, the image processing apparatus comprising:
a storage unit for storing image data including an object of recognition and a plurality of recognition dictionaries;
a communication unit for establishing communication with one of the plurality of servers to receive, from the server with which the communication has been established, designation information designating a recognition dictionary for recognizing the object of recognition included in the image data;
a recognition unit for recognizing the object of recognition included in the image data using the recognition dictionary designated in the received designation information from the plurality of recognition dictionaries stored in said storage unit; and
an invalidation determination unit for determining whether or not an invalidation determination condition is met for the recognition dictionary, and for invalidating the recognition dictionary if the invalidation determination condition is met,
wherein the invalidation determination condition is that the communication with the server is out of a wireless communication area.

5. An image processing system including an image processing apparatus and a plurality of servers,
wherein the image processing apparatus comprises:
(a) a storage unit for storing image data including an object of recognition; and
(b) a communication unit for establishing communication with one of the plurality of servers; and
(c) a recognition unit,
wherein the server with which the communication has been established comprises a transmission unit for transmitting a recognition dictionary for recognizing the object of recognition to the image processing apparatus with which the communication has been established,
wherein the recognition unit is for recognizing the object of recognition included in the image data using the recognition dictionary from the server, and
wherein the image processing apparatus further comprises an invalidation determination unit for determining whether or not a predetermined time has passed since the reception of the recognition dictionary by the communication unit, and for invalidating the recognition dictionary if the predetermined time has passed.

6. The image processing system according to claim 5, wherein for use of the recognition dictionaries, different charges are set for different recognition dictionaries used.

7. A control method for an image processing apparatus capable of communicating with a plurality of servers, the image processing apparatus comprising a storage unit for storing image data including an object of recognition and a plurality of recognition dictionaries, the control method comprising:
- a step of establishing communication with one of the plurality of servers to receive, from the server with which the communication has been established, a recognition dictionary for recognizing the object of recognition included in the image data;
- a step of recognizing the object of recognition included in the image data using the received recognition dictionary; and
- a step of determining whether or not a predetermined time has passed since the reception of the recognition dictionary by said communication establishing step, and of invalidating the recognition dictionary if the predetermined time has passed.

8. A non-transitory computer-readable storage medium for storing a program which causes a computer to perform the steps of the control method for an image processing apparatus according to claim 7.

9. A method for an image processing apparatus capable of communicating with a plurality of servers, the image processing apparatus comprising a storage unit for storing image data including an object of recognition and a plurality of recognition dictionaries, the method comprising:
- a step of establishing communication with one of the plurality of servers to receive, from the server with which the communication has been established, designation information designating a recognition dictionary for recognizing the object of recognition included in the image data; and
- a step of recognizing the object of recognition included in the image data using the recognition dictionary designated in the received designation information from the plurality of recognition dictionaries stored in said storage unit; and
- a step of determining whether or not an invalidation determination condition is met for the recognition dictionary, and of invalidating the recognition dictionary if the invalidation determination condition is met,
- wherein the invalidation determination condition is that a predetermined number of shots has been reached since the reception of the recognition dictionary by said communication unit.

10. A non-transitory computer-readable storage medium for storing a program which causes a computer to perform the method according to claim 9.

11. A method for an image processing apparatus capable of communicating with a plurality of servers, the image processing apparatus comprising a storage unit for storing image data including an object of recognition and a plurality of recognition dictionaries, the method comprising:
- a step of establishing communication with one of the plurality of servers to receive, from the server with which the communication has been established, designation information designating a recognition dictionary for recognizing the object of recognition included in the image data; and
- a step of recognizing the object of recognition included in the image data using the recognition dictionary designated in the received designation information from the plurality of recognition dictionaries stored in said storage unit; and
- a step of determining whether or not an invalidation determination condition is met for the recognition dictionary, and of invalidating the recognition dictionary if the invalidation determination condition is met,
- wherein the invalidation determination condition is that the communication with the server is out of a wireless communication area.

12. A non-transitory computer-readable storage medium for storing a program which causes a computer to perform the method according to claim 11.

13. An image processing system including an image processing apparatus and a plurality of servers,
- wherein the image processing apparatus comprises:
  - (a) a storage unit for storing image data including an object of recognition;
  - (b) a communication unit for establishing communication with one of the plurality of servers; and
  - (c) a recognition unit,
- wherein the server with which the communication has been established comprises a transmission unit for transmitting a recognition dictionary for recognizing the object of recognition to the image processing apparatus with which the communication has been established,
- wherein the recognition unit is for recognizing the object of recognition included in the image data using the recognition dictionary from the server,
- wherein the image processing apparatus further comprises an invalidation determination unit for determining whether or not an invalidation determination condition is met for the recognition dictionary, and for invalidating the recognition dictionary if the invalidation determination condition is met, and
- wherein the invalidation determination condition is that a predetermined number of shots has been reached since the reception of the recognition dictionary by said communication unit.

14. An image processing system including an image processing apparatus and a plurality of servers,
- wherein the image processing apparatus comprises:
  - (a) a storage unit for storing image data including an object of recognition;
  - (b) a communication unit for establishing communication with one of the plurality of servers;
  - (c) a recognition unit,
- wherein the server with which the communication has been established comprises a transmission unit for transmitting a recognition dictionary for recognizing the object of recognition to the image processing apparatus with which the communication has been established,
- wherein the recognition unit is for recognizing the object of recognition included in the image data using the recognition dictionary from the server,
- wherein the image processing apparatus further comprises an invalidation determination unit for determining whether or not an invalidation determination condition is met for the recognition dictionary, and for invalidating the recognition dictionary if the invalidation determination condition is met, and
- wherein the invalidation determination condition is that the communication with the server is out of a wireless communication area.

* * * * *